United States Patent
Goreaud et al.

(10) Patent No.: US 12,039,367 B2
(45) Date of Patent: Jul. 16, 2024

(54) METHOD AND SYSTEM FOR USING COMPUTATIONAL RESOURCES OF A MULTIPROCESSOR COMPUTING SYSTEM

(71) Applicant: FRAMATOME, Courbevoie (FR)

(72) Inventors: Nicolas Goreaud, Courbevoie (FR); Romain Reboulleau, Courbevoie (FR); Remi Batail, Courbevoie (FR)

(73) Assignee: FRAMATOME, Courbevoie (FR)

( * ) Notice: Subject to any disclaimer, the term of this patent is extended or adjusted under 35 U.S.C. 154(b) by 386 days.

(21) Appl. No.: 17/435,519

(22) PCT Filed: Feb. 28, 2020

(86) PCT No.: PCT/EP2020/055266
§ 371 (c)(1),
(2) Date: Sep. 1, 2021

(87) PCT Pub. No.: WO2020/178168
PCT Pub. Date: Sep. 10, 2020

(65) Prior Publication Data
US 2022/0147387 A1 May 12, 2022

(30) Foreign Application Priority Data
Mar. 1, 2019 (FR) ..................... 19 02132

(51) Int. Cl.
*G06F 9/48* (2006.01)
*G06F 9/46* (2006.01)
*G06F 9/50* (2006.01)

(52) U.S. Cl.
CPC ............ *G06F 9/4881* (2013.01); *G06F 9/461* (2013.01); *G06F 9/485* (2013.01); *G06F 9/5011* (2013.01);
(Continued)

(58) Field of Classification Search
CPC ........ G06F 9/4881; G06F 9/461; G06F 9/485; G06F 9/5011; G06F 2209/483; G06F 2209/503; G06F 9/5066
See application file for complete search history.

(56) References Cited

U.S. PATENT DOCUMENTS

| | | | |
|---|---|---|---|
| 2012/0060165 A1* | 3/2012 | Clarke | G06F 11/3006 709/224 |
| 2015/0154056 A1* | 6/2015 | Chen | G06F 9/4856 718/103 |

(Continued)

OTHER PUBLICATIONS

Corresponding Search Report for PCT/EP2020/055266.
(Continued)

*Primary Examiner* — Jorge A Chu Joy-Davila
(74) *Attorney, Agent, or Firm* — Davidson Kappel LLC

(57) ABSTRACT

A system (1) includes a module (30) for calculating a design of experiment comprising a plurality of software tasks to be performed in order to solve a predetermined physical problem. The software tasks of the design of experiment have a first priority level. The system also includes a module (4) for scheduling the execution of software tasks by the computing system, configured to check for the presence of at least one software task with a second priority level higher than the first priority level waiting to be executed; in case of the presence of at least one such software task, obtaining freed-up computational resources for executing said at least one software task of a second priority level; in the absence of at least one such software task, allocate at least some of the software tasks of the first priority level to the available computational resources.

11 Claims, 3 Drawing Sheets

(52) U.S. Cl.
CPC .. *G06F 2209/483* (2013.01); *G06F 2209/503* (2013.01)

(56) References Cited

U.S. PATENT DOCUMENTS

2019/0171483 A1* 6/2019 Santhar ................ G06F 9/4881
2020/0201679 A1* 6/2020 Wentz ................ H04L 63/1433

OTHER PUBLICATIONS

Corresponding Search Report for FR 19 02132.
Teng Fei et al: "Scheduling Real-Time Workflow on MapReduce-based cloud", Third International Conference on Innovative Computing Technology, pp. 117-122.

* cited by examiner

METHOD AND SYSTEM FOR USING COMPUTATIONAL RESOURCES OF A MULTIPROCESSOR COMPUTING SYSTEM

The present disclosure relates to a method and system for using computational resources of a computing system comprising a plurality of interconnected microprocessors adapted to operate in parallel, to perform software tasks.

The present disclosure is in the field of optimising computational resources in microprocessor clusters, and has a particular application in exploiting such computational resources to solve complex physical problems, for example to simulate physical phenomena, using iterative calculations that involve solving mathematical equations which model physical phenomena.

In particular, the present disclosure is applicable in the field of computer simulation, especially in the context of resource-intensive simulation processes or the computational solving of fluid dynamics problems.

BACKGROUND

The use of interconnected microprocessor clusters to perform simulation calculations of complex physical problems is known, as such microprocessor clusters allow for an increase in computing capacity. To make better use of such microprocessor clusters, there is software for managing the computational queues to smooth out the load on the microprocessors. This software is generic, and does not take into account any specific software tasks to be performed in a particular field or optimal priority management. Optimal priority management means that each software task by itself, in its own context, has the lowest possible economic cost to the user. In the prior art, computing clusters are sized to absorb peak loads. In practice, this results in the microprocessor cluster's computing power representing 120 to 150% of the computing power required outside of peak times. In addition, peak load management requires the availability of under-utilised additional software licenses that are only used during peak loads.

SUMMARY

There is therefore a need to optimise the use of the resources of a computing system with a cluster of interconnected microprocessors.

To that end, the present disclosure relates to a method for using computational resources of a computing system comprising a plurality of interconnected microprocessors adapted to operate in parallel, to perform software tasks. This method uses:
  a process for calculating a design of experiment comprising a plurality of software tasks to be performed in order to solve a predetermined physical problem defined by at least one input parameter and at least one output parameter, the design of experiment being calculated as a function of a predetermined initial computational budget, said software tasks of the design of experiment having a first priority level,
  a process for scheduling the execution of software tasks by the computing system, configured to:
  check for the presence of at least one software task with a second priority level higher than the first priority level waiting to be executed,
  if there is at least one software task of the second priority level waiting to be executed, obtain freed-up computing resources to execute said at least one software task of the second priority level;
  in the absence of at least one software task of the second priority level waiting to be executed, allocate at least some of the software tasks of the first priority level to the available computational resources.

Advantageously, thanks to the management of the first and second priority levels of the software tasks, the method enables optimised use of the available computational resources.

The method of using computational resources according to the present disclosure may have one or more of the following features, taken independently or in any acceptable combination:

Obtaining freed-up computational resources comprises analyzing available computational resources, and in the event that there are no available computational resources, analyzing currently running software tasks of the first priority level, stopping at least some of said software tasks of the first level and saving an associated runtime environment.

Obtaining freed-up computational resources also comprises checking for the availability of a license to perform a software task of the second priority level.

The method further comprises, in the absence of at least one software task of the second priority level waiting to be executed, a resumption of executing software tasks of the first priority level that have been stopped.

Allocating at least some of the software tasks of the first priority level to the available computational resources comprises analyzing the available computational resources, including an analysis of available computing queues, and allocating the software tasks of the first priority level to selected computing queues.

The process of calculating a design of experiment implements a supervised learning algorithm of a statistical meta-model.

The statistical meta-model is a Gaussian process regression model, and the process of calculating a design of experiment implements an entropy maximization of a covariance kernel of said Gaussian process.

Calculating a design of experiment comprises determining an experimental space from the input parameters of the problem to be solved, meshing of said experimental space into calculation points, and determining a set of calculation points according to an associated computational budget.

The calculation of a design of experiment is iterated based on execution results obtained from executing a previous design of experiment, and where at each iteration a current computational budget is calculated.

The current computational budget is equal, at each iteration, to half of a remaining computational budget calculated according to the initial computational budget and a computational budget consumed in previous iterations.

The computational iteration of a design of experiment to solve a predetermined physical problem is stopped when a stopping criterion has been met, in particular when the remaining computational budget has been consumed.

According to another aspect the present disclosure concerns the use of the resources of a computing system comprising a plurality of interconnected microprocessors adapted to operate in parallel, to perform software tasks. This system comprises:
  a module for calculating a design of experiment comprising a plurality of software tasks to be performed in order to solve a predetermined physical problem defined by at least one input parameter and at least one output parameter, the design of experiment being calculated as a function of a predetermined initial computational budget, said software tasks of the design of experiment having a first priority level, a process for scheduling the execution of software tasks by the computing system, configured to:

check for the presence of at least one software task with a second priority level higher than the first priority level waiting to be executed, if there is at least one software task of the second priority level waiting to be executed, obtain freed-up computing resources to execute said at least one software task of the second priority level;

in the absence of at least one software task of the second priority level waiting to be executed, allocate at least some of the software tasks of the first priority level to the available computational resources.

BRIEF SUMMARY OF THE DRAWINGS

Further features and advantages of the present disclosure will become apparent from the detailed description given below, by way of indication and not in any way limiting, with reference to the appended figures, in which.

DETAILED DESCRIPTION

The present disclosure will be described hereafter in its application to simulation and computations associated with solving physical problems, executed as sequences of software tasks, but is not limited to this field of application.

Figure 1:
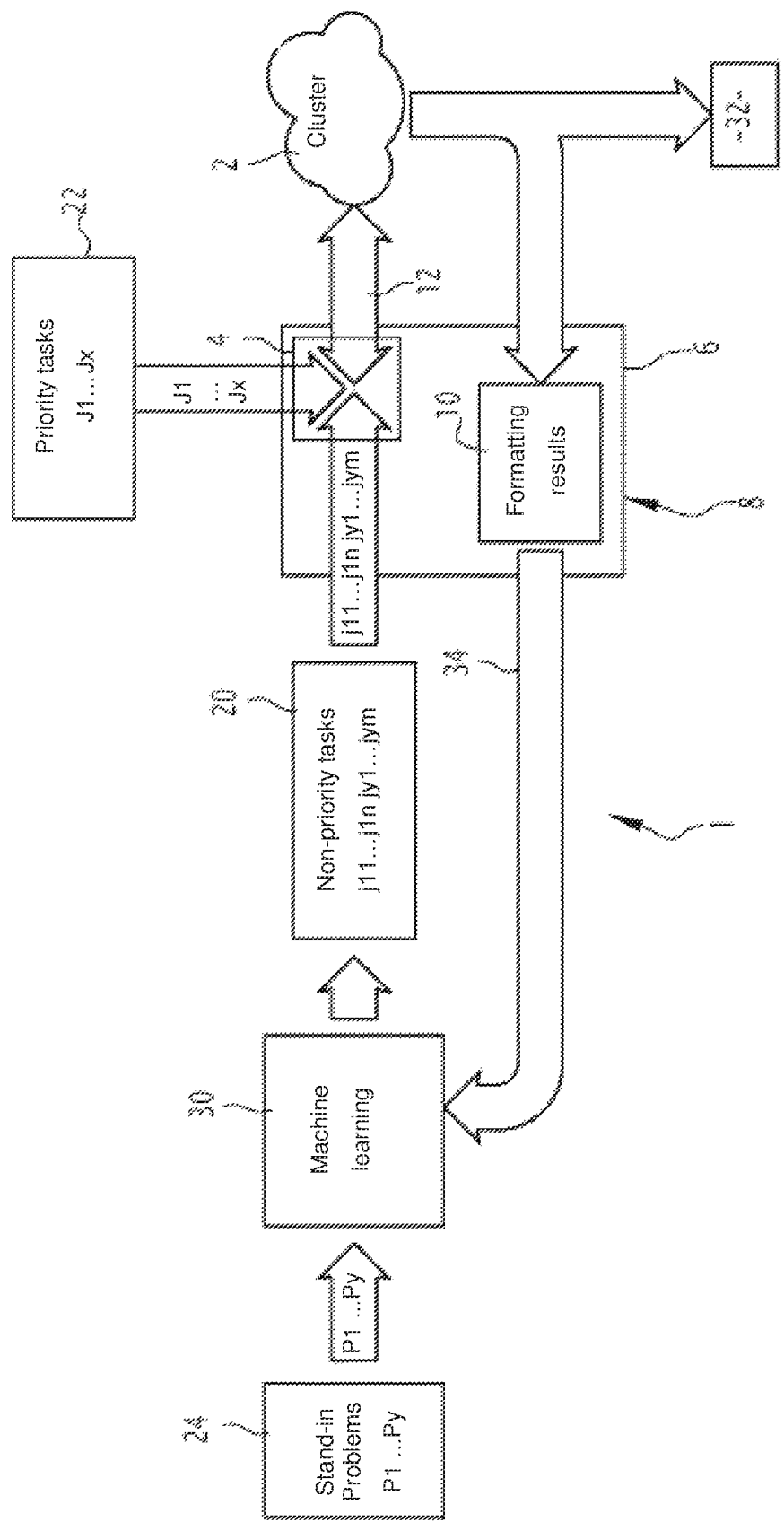
FIG. 1 schematically illustrates a system for using the computational resources of a microprocessor cluster according to one embodiment.

The computational resource utilisation system 1 in FIG. 1 comprises a cluster of interconnected microprocessors forming a computing system 2.

The microprocessors are divided into interconnected computational nodes and grouped into different computational queues, each with an associated computational capacity.

For example, in one practical embodiment, the cluster 2 consists of a plurality of interconnected programmable electronic devices, e.g. computers, each programmable electronic device comprising an electronic memory unit and a central processing unit, or CPU, including one or more electronic microprocessors, adapted to communicate via a communication bus. Alternatively, each programmable electronic device is implemented as programmable logic components, such as Field-Programmable Gate Arrays (FPGAs), or as dedicated integrated circuits, such as Application-Specific Integrated Circuits (ASICs).

Programmable electronic devices are adapted to perform software tasks, based on computer code instructions in executable format, in any suitable format.

A software task is defined here as the execution of a computer program on a set of input data.

The system 1 also comprises a module 4 for scheduling the execution of software tasks.

In one embodiment, the module 4 is implemented as an executable computer program, stored in a memory unit 6 of a programmable electronic device 8 forming part of the cluster 2, and executable by a processor of the programmable electronic device 8.

The memory unit 6 also stores a module 10 for formatting software task execution results.

The software task execution scheduling module 4 of the system 1 is configured to manage the execution of software tasks 20 of the first priority level, also called low-priority tasks, and software tasks 22 of the second priority level, also called high-priority tasks.

For example, software tasks that have priority come from user commands.

Non-priority software tasks are associated with physical problems to be investigated $P_1 \ldots P_Y$, and are intended to be executed when space is available on the cluster.

Each physical problem to be studied $P_L$ is defined by a set of data, which are for example stored in a file 24 stored on a computer-readable physical medium, and provided as input to the system 1.

In one embodiment, a physical problem is defined as:
a computer code and an associated data set;
a set of input parameters, each input parameter having an associated range of values. For example, a parameter marked Parameter_i is between the minimum Val_min_i and maximum Val_max_i;
at least one output parameter;
an associated computational budget.
a minimum number of microprocessors to be used.

When simulating a physical phenomenon, solving the physical problem consists of studying the values of one or more output parameters, considered to be parameters of interest, as a function of the values of the input parameters.

Non-exhaustive examples of such physical phenomena are for example: Calculating the time to completely melt a metal block subjected to a heat source on a wall, depending on the heating power, the outside temperature, the heat capacity of the material and the dimensions of the block; depending on an angle and a size of a baffle, calculating an associated pressure loss; depending on the input parameters: inlet velocity in the computational domain, dynamic viscosity, geometrical dimension of the computational domain, calculating a pressure variation at the boundaries of the computational domain, recirculation length.

The computational budget is, in one embodiment, a maximum number of software tasks to be executed to solve the physical problem.

Alternatively or additionally, the computational budget also comprises the minimum number of microprocessors to be taken into account for the calculation.

For example, the computer code is scientific calculation software, which searches for a solution to equations representing physical phenomena in an iterative way. In one embodiment, such software is subject to a runtime license, and the number of parallel runs is limited to the number of runtime licenses available.

Each physical problem $P_L$, defined by a set of data as described above, is processed by a design of experiment calculation module 30.

In one embodiment, the module 30 is implemented as a computer program executable by one of the programmable electronic devices of the cluster 2.

The module 30 implements a design of experiment process for each physical problem to be addressed.

A design of experiment is defined by a set of simulations to be performed, each simulation implementing a plurality of software tasks to be executed, with a set of chosen parameters as input, each simulation obtaining a value for each chosen output parameter forming an execution result 32.

The execution result is provided, e.g. in raw form, e.g. a binary file, to an operator via a suitable system interface, e.g. as a computer file.

In addition, the execution result 32 in raw form is passed to the software task execution result formatting module 10, which generates formatted execution results 34. These formatted results contain the input and output parameters of the problem, which are extracted, if necessary, from the raw execution results, which contain a lot of data.

Advantageously, the design of experiment calculation module 30 is adapted to iteratively calculate successive design of experiments for solving a given physical problem, taking into consideration, for the calculation of a current design of experiment, formatted results 34 resulting from the execution of software tasks implemented for the previous steps of the design of experiment.

In particular, it is intended to generate successive design of experiments with decreasing runtimes or decreasing numbers of parameter sets.

Figure 2:
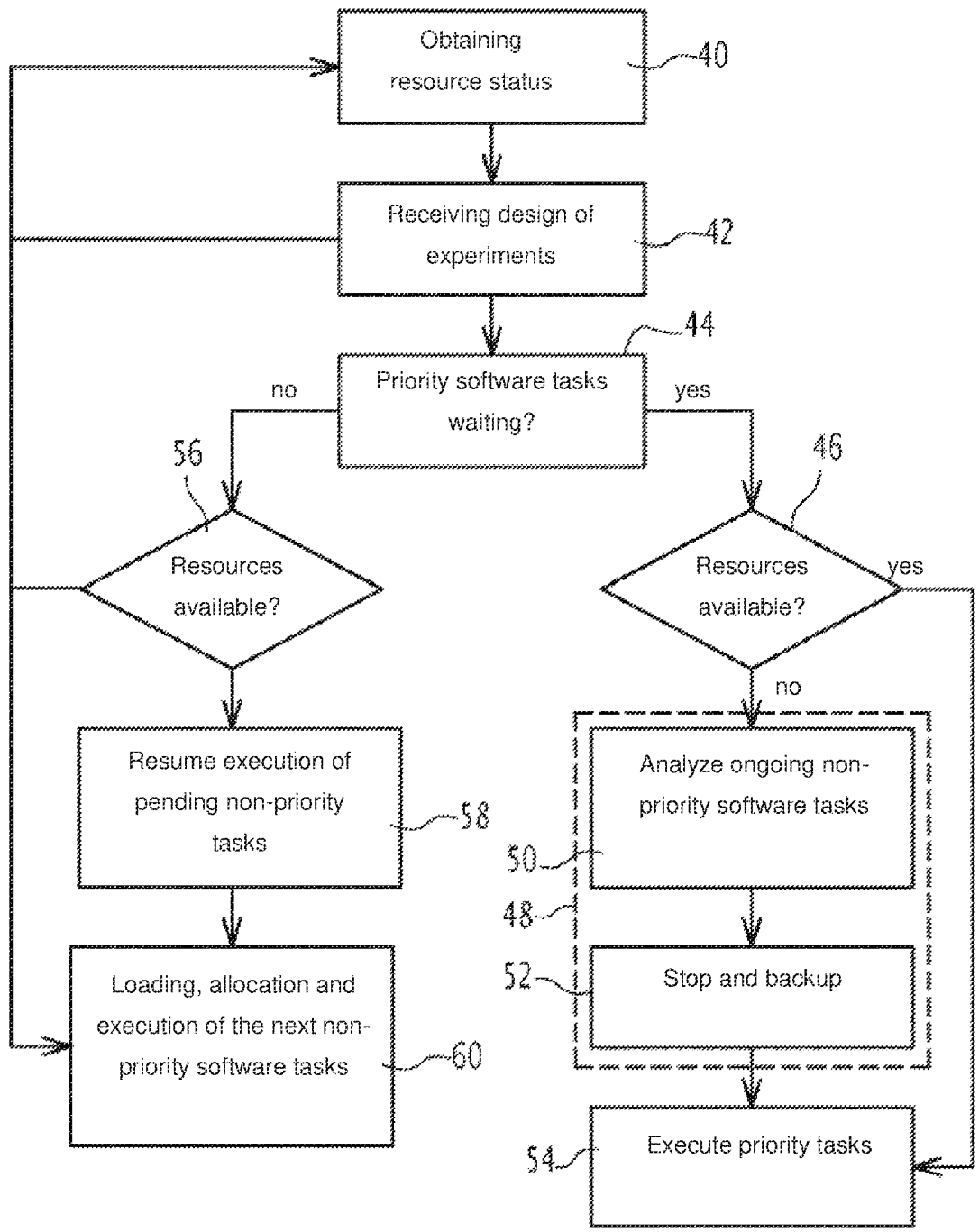
FIG. 2 is a synoptic diagram of the processes implemented in one embodiment of a method for using computational resources according to one embodiment.

FIG. 2 is an overview of the processes implemented by the software task scheduling module 4.

The module 4 implements a step of obtaining 40 the status of hardware resources, in particular the availability of computational resources in the interconnected microprocessors of cluster 2.

For example, the number of microprocessors available from the plurality of interconnected microprocessors is obtained in step 40. This step is repeated at regular time intervals, for example every minute.

The module 4 also implements a step 42 of receiving requests to execute software tasks of the first priority (non-priority software tasks) submitted by the design of experiment calculation module 30, and a step 44 of checking for the presence of requests to execute software tasks of the second priority (priority software tasks). For example, non-priority software tasks are submitted in a first computation queue, and priority software tasks are submitted in a second computation queue.

The steps 42 and 44 are, for example, performed substantially in parallel, and repeated at regular time intervals.

If there are priority software tasks waiting to be executed, the module 4 retrieves (step 46) information about the current availability of computational resources. The availability of computational resources in this context comprises the availability of computing microprocessors and also the availability of software licenses, for example through a license token mechanism, to perform priority software tasks.

If available, the execution of the priority task(s) is started (step 54).

In the event that computational resources are unavailable, the step 46 is followed by a step 48 of releasing computational resources to perform priority software tasks.

The step 48 comprises a sub-step 50 of analyzing the non-priority software tasks being executed, and selecting non-priority software tasks to be stopped, based on the computational resources and licenses consumed.

For example, the software tasks of a design of experiment implemented to solve a given physical problem are selected.

Then, in a sub-step 52, the selected non-priority software tasks are stopped and their runtime environment is stored, so as to provide the possibility of resuming the execution of these tasks later (step 58 below). In addition, any license tokens freed up by the termination of one of the non-priority tasks are made available again.

Thus, advantageously, when the software task execution scheduling module 4 detects the presence of priority software tasks waiting to be executed, it obtains freed-up computational resources to allow the execution of these software tasks in the execution step 54. The priority software task(s) are allocated to the computational queues with available computational resources.

When no priority software tasks waiting to be executed have been detected in the step 44, the module 4 checks (step 56) for available computational resources, including licensing resources.

If computational resources are available, non-priority software tasks that were previously stopped are resumed (step 58), if necessary. Non-priority software tasks waiting to be executed, which are part of design of experiments submitted by the design of experiment calculation module 30, are loaded and executed on the available computational resources (step 60).

In one embodiment, in step 60, a computation queue is selected for the execution of a non-priority software task, depending on the resource status of the cluster, for example depending on the number of available microprocessors and the number of computations to be performed for execution of the software task(s).

Non-priority software tasks in a given design of experiment are executed until a stopping criterion is met. In one embodiment, meeting the stopping criterion corresponds to reaching the predetermined computational budget in terms of number of computations or reaching a target value of problem learning performance.

The non-priority software tasks are determined by the design of experiments module 30, an operation of which is described below with reference to FIG. 3. Advantageously, the use of computational resources is optimised, while maintaining the prioritisation of certain priority software tasks, in particular software tasks whose processing is required by a user.

Figure 3:
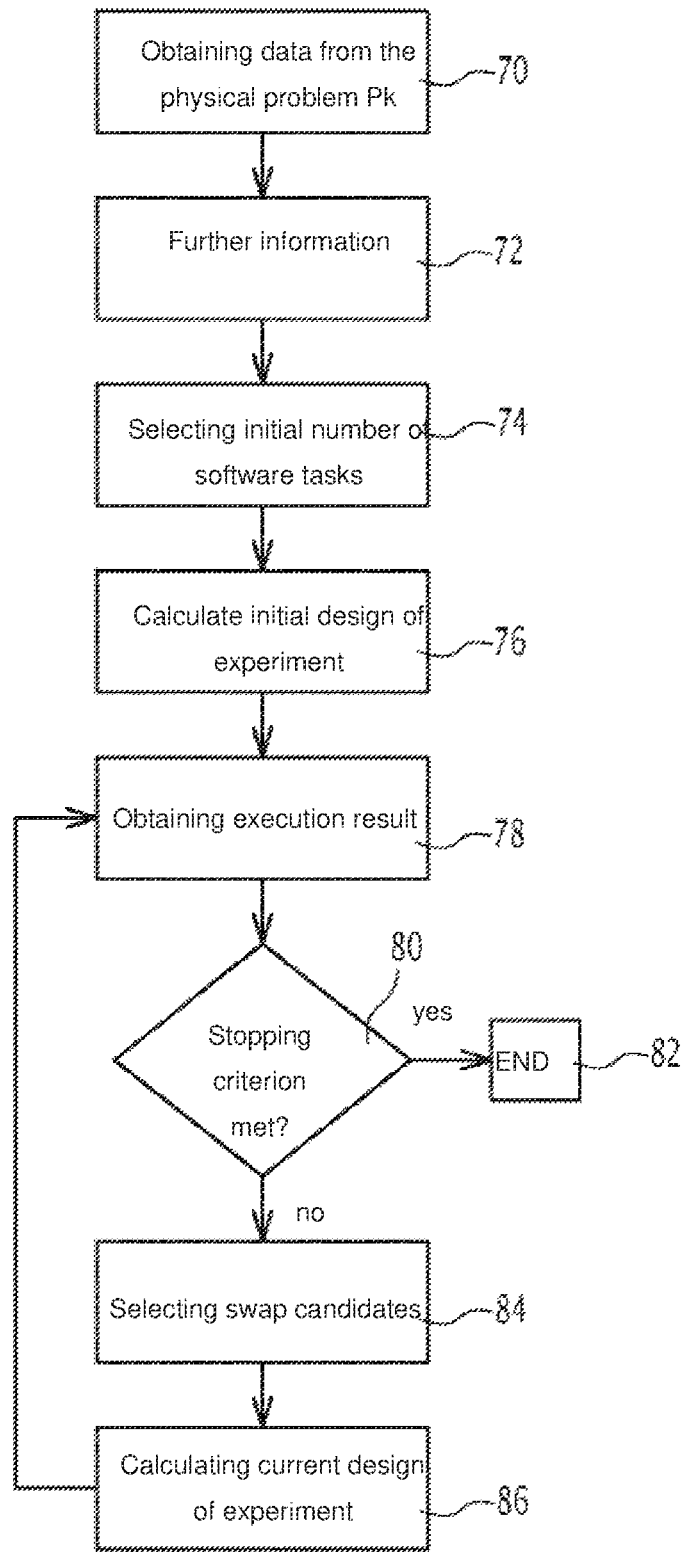
FIG. 3 is a synoptic diagram of the steps for generating design of experiments in one embodiment.

FIG. 3 is an synoptic diagram of the processes implemented by the design of experiment calculation module 30.

In a first step 70, the data defining the physical problem to be solved is obtained. For example, this data is provided by an operator. Advantageously, this is the only intervention by a human operator, with the generating of successive design of experiments being carried out automatically by the module 30.

In one embodiment, a physical problem $P_L$ is defined as:
- a computer code and an associated data set;
- a set of $N_L$ input parameters, each input parameter having an associated range of values. For example, a parameter marked Parameter_i is between the minimum Val_min_i and maximum Val_max_i;
- at least one output parameter;
- an associated initial computational budget $B_L$.

In the initialization step 70, no additional knowledge about the dependencies between input and output parameters is required.

For example, for a problem $P_L$, the computational budget is a maximum number of software tasks to be performed to solve the problem $P_L$.

An experimental space is defined by the number $N_L$ of input parameters, which is a positive integer, depending on the problem $P_L$ to be solved. The experimental space is a hyper-block of dimensions $N_L$, possibly reduced by the user based on needless combinations of parameters. A mesh of this experimental space into calculation points is then defined.

By default, during the initialization step, the mesh is isotropic.

For example, the mesh is defined so that the total number of calculation points is less than a predetermined limit value, for example $10^5$.

Optionally, additional information is provided in a step 72, for example information to refine the mesh of the experimental space.

Then, the initial design of experiment for solving the physical problem $P_L$ is computed, depending on the remaining computational budget.

The remaining computational budget is the value corresponding to the initial computational budget minus the computational budget already consumed. At initialization, the remaining computational budget is equal to the initial computational budget.

In step 74, a computational budget for the current design of experiment is calculated.

Preferably, for the initial design of experiment, the computational budget is chosen to be a fraction of the remaining budget, for example half: $M_{L,0}=B_L/2$. The remaining computational budget is then also equal to $B_L/2$.

Next, an initial design of experiment is designed in step 76, consisting of choosing a number of computational points $NP_{L,0}$ on which the computer code is to be executed, forming a set of software tasks to be executed, depending on the available computational budget $M_{L,0}$. The design of the design of experiment is based on an optimization procedure described in detail below with reference to steps 84 and 86, focusing on an optimality criterion of the design of experiment, for example a maximum entropy criterion (in the sense of Shannon's information theory). Of course, this is an example of an optimality criterion, other criteria could be used.

In one embodiment, the design of experiment is initialized by randomly drawing from the experiment space and then improved by the optimization procedure.

Alternatively, the design of experiment is built point-by-point with the objective of optimizing the same criterion as the optimization procedure each time there is an addition.

The generated design of experiment is transmitted to the software task scheduling module 4 and executed by the cluster 2.

Formatted execution results 34 are received in step 78 following the execution of the design of experiment.

These execution results are processed by the module 30 to update a knowledge of the problem $P_L$ to be addressed, in order to allow the generating of the design of experiment to be optimized. In particular, the influence of the input parameters on the values of the output parameters, known from the execution results, is analyzed, in order to refine the selection of the calculation points for generating the design of experiment.

In one embodiment, the module 30 constructs a mathematical meta-model and implements a supervised statistical learning algorithm based on the execution results. For example, the statistical meta-model is a Gaussian process regression model. Gaussian process regression models are well known in the field of statistical data processing. They treat the covariance of the Gaussian random variable representative of the modelled process as an analytical function, also called a kernel, parameterized by scalar values called hyperparameters. The module 30 optimizes the hyperparameters of the covariance kernel, for example by the maximum likelihood method.

In one embodiment, the Gaussian process regression with an a priori covariance kernel $k_\theta$ is related to the optimality criterion of the design of experiment. For example, the optimality criterion is to maximize the determinant of the matrix K such that:

$K_{ij}=k_\theta(x_i, x_j)$ where $x_i$, $x_j$ are calculation points of the design of experiment.

In one embodiment, for a given $P_L$ problem, successive design of experiments are generated and executed iteratively until a stopping criterion is met.

Whether the stopping criterion has been met is checked in a step 80.

In one embodiment, the stopping criterion is validated when the initial computational budget has been consumed, or in other words, when the remaining computational budget is 0. In this case, the step 80 is followed by the stopping of the computation (step 82).

If there is a remaining computational budget at the current iteration, a current computational budget is established.

Alternatively, reaching a performance target value is also a stopping criterion. Thus, the computations are stopped if the performance target value is reached, even if the computational budget has not been fully consumed.

In one embodiment, the performance criterion is the average value of the coefficient of determination of the linear regression between the exact result of the simulation on the one hand, and the result predicted by the meta-model on the other hand, the latter being trained on a selection of other cases, for example by the "10-fold cross-validation" method. The target value of the performance criterion is then set when the problem is submitted by the user, and can typically be on the order of 0.95.

If the stopping criterion is not met, the computational budget for the current iteration $i_c$, the so-called current computational budget, is calculated, and in one embodiment is equal to half of the remaining computational budget.

Based on the current computational budget, calculation points are selected (step 84), and a current design of experiment is computed (step 86).

In one embodiment, a swap procedure optimization algorithm configured to increase the entropy of the Shannon information is implemented.

Candidate swap points are selected in the following way. A number $P_{L,ic}$ of "at-risk" calculation points is determined, for example a percentage of the $N_{L,ic}$ calculation points of the current design of experiment. For example, this percentage is between 10% and 30%.

The normalized covariance matrix K is calculated, and the inverse matrix $K^{-1}$, the so-called precision matrix, is calculated. On the basis of these matrices, $P_{L,ic}$ calculation points are selected. These calculation points are the points with the least mutual information with the other calculation points of the previously executed design of experiment.

They are replaced by new calculation points searched for in the experimental space, making it possible to increase the mutual information, which computationally translates into an increase in the value of the determinant of the covariance matrix K calculated with the new calculation points.

Advantageously, this optimization of the mutual information allows the deepest possible understanding of the problem, with a fixed computational budget.

A current design of experiment, for the current iteration $i_c$, is obtained in step 86.

Steps 78 to 86 are iterated until the stopping criterion is met.

Advantageously, the design of experiment calculation module 30 implements supervised statistical methods for automated solving of the problems to be solved, while controlling the computational budget and dispensing with human intervention.

Advantageously, the process implemented by the calculation module allows calculations to be carried out with control of hardware resources and execution time thanks to the implementation of the computational budget.

In particular, the choice of decreasing computational budgets in conjunction with the swap optimisation algorithm allows the performance of the design of experiments to be improved while limiting the computational resources used.

Advantageously, the module 4 for scheduling the execution of software tasks implements an optimization of the use of resources, while managing the priorities of software tasks to be executed.

The computational resource utilisation system 1 including these two modules working together allows for optimized and controlled cost management, including hardware cost, license cost and human intervention costs, with computation time and resource optimization being optimized.

What is claimed is:

1. A method for using computational resources of a computing system comprising a plurality of interconnected microprocessors configured to operate in parallel, to perform software tasks, the method comprising implementing, by the computing system:
    calculating a design of experiment comprising a plurality of software tasks to be performed in order to solve a predetermined physical problem defined by at least one input parameter and at least one output parameter, the design of experiment being calculated as a function of a predetermined initial computational budget, the software tasks of the design of experiment having a first priority level, wherein calculating of the design of experiment comprises determining an experimental space from the input parameters of the predetermined physical problem, meshing of the experimental space into calculation points, and determining a set of calculation points according to an associated computational budget; and
    scheduling the execution of software tasks by the computing system, configured to:
        check for the presence of at least one software task with a second priority level higher than the first priority level waiting to be executed;
        if there is at least one software task of the second priority level waiting to be executed, obtain freed-up computing resources to execute the at least one software task of the second priority level; and
        in an absence of at least one software task of the second priority level waiting to be executed, allocate at least some of the software tasks of the first priority level to the available computational resources.

2. The method according to claim 1, wherein the obtaining of freed-up computational resources comprises analyzing available computational resources, and in the event that there are no available computational resources, analyzing currently running software tasks of the first priority level, stopping the execution at least some of the software tasks of the first level and saving an associated runtime environment.

3. The method according to claim 2, wherein obtaining freed-up computational resources also comprises checking for an availability of a license to perform a software task of the second priority level.

4. The method according to claim 1, further comprising, in the absence of at least one software task of the second priority level waiting to be executed, resuming executing software tasks of the first priority level that have been stopped.

5. The method according to claim 1, wherein the allocating at least some of the software tasks of the first priority level to the available computational resources comprises analyzing the available computational resources, including an analysis of available computing queues, and allocating the software tasks of the first priority level to selected computing queues.

6. The method according to claim 1, wherein the calculating of the design of experiment implements a supervised learning algorithm of a statistical meta-model.

7. The method according to claim 6, wherein the statistical meta-model is a Gaussian process regression model, and the calculating of the design of experiment implements an entropy maximization of a covariance kernel of said Gaussian process.

8. The method according to claim 1, wherein the calculation of the design of experiment is iterated based on execution results obtained from executing a previous design of experiment, and where at each iteration a current computational budget is calculated.

9. The method according to claim 8, wherein the current computational budget is equal, at each iteration, to half of a remaining computational budget calculated according to the initial computational budget and a computational budget consumed in previous iterations.

10. The method according to claim 9, wherein the computational iteration of the design of experiment to solve the predetermined physical problem is stopped when a stopping criterion has been met, in particular when the remaining computational budget has been consumed.

11. A system for using computational resources of a computing system comprising a plurality of interconnected microprocessors configure to operate in parallel, to perform software tasks, the system comprising:
    a module for calculating a design of experiment comprising a plurality of software tasks to be performed in order to solve a predetermined physical problem defined by at least one input parameter and at least one output parameter, the design of experiment being calculated as a function of a predetermined initial computational budget, the software tasks of the design of experiment having a first priority level, wherein calculating of the design of experiment comprises determining an experimental space from the input parameters of the predetermined physical problem, meshing of the experimental space into calculation points, and determining a set of calculation points according to an associated computational budget,
    a module for scheduling the execution of software tasks by the computing system, configured to:
        check for the presence of at least one software task with a second priority level higher than the first priority level waiting to be executed,
        if there is at least one software task of the second priority level waiting to be executed, obtain freed-up computing resources to execute the at least one software task of the second priority level;
        in an absence of at least one software task of the second priority level waiting to be executed, allocate at least some of the software tasks of the first priority level to the available computational resources.

* * * * *